Sept. 11, 1956     N. NORDENSTAM     2,762,344
VALVE MECHANISM FOR FLUID MOTORS
Filed March 1, 1954                                2 Sheets-Sheet 1
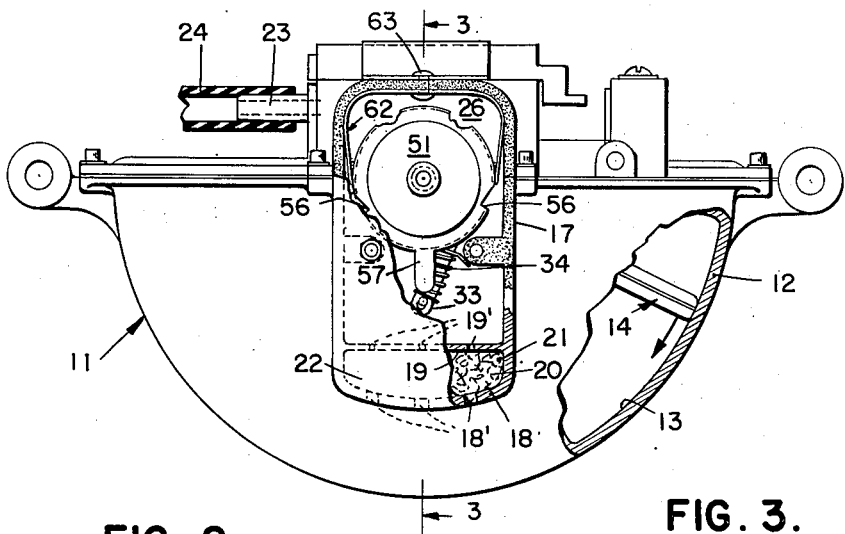
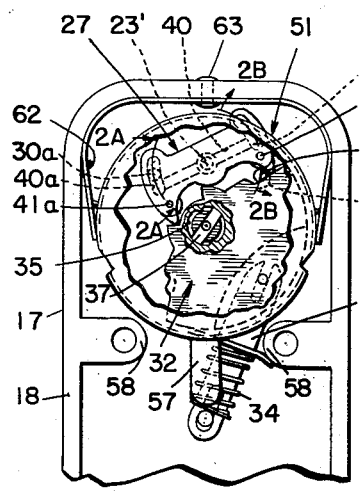
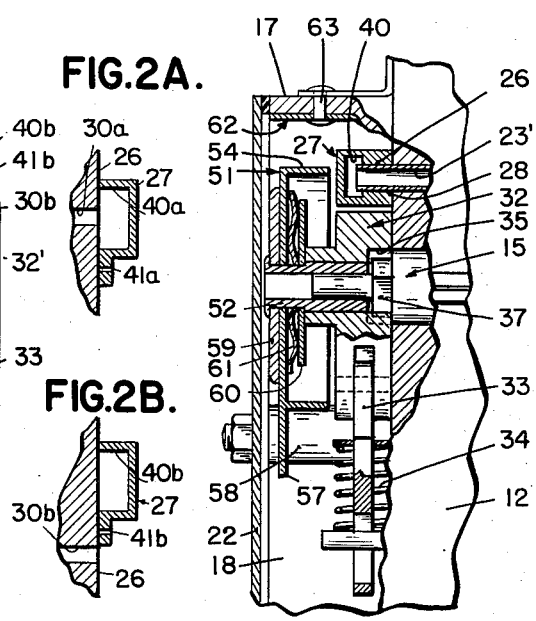
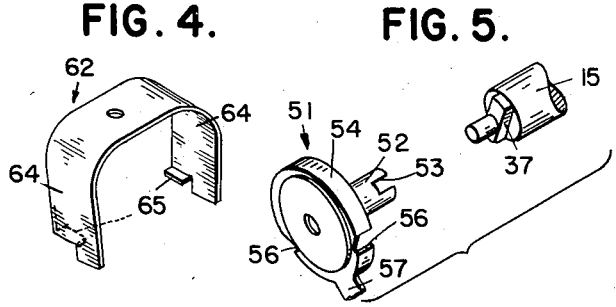
INVENTOR
NORRIS NORDENSTAM
BY
                             ATTORNEYS Sept. 11, 1956  N. NORDENSTAM  2,762,344
VALVE MECHANISM FOR FLUID MOTORS
Filed March 1, 1954  2 Sheets-Sheet 2

INVENTOR
NORRIS NORDENSTAM
BY
Mason & Graham
ATTORNEYS

United States Patent Office 2,762,344
Patented Sept. 11, 1956

2,762,344
VALVE MECHANISM FOR FLUID MOTORS
Norris Nordenstam, Riverside, Calif.

Application March 1, 1954, Serial No. 413,232

8 Claims. (Cl. 121—164)

This invention relates to fluid-operated motors such as those embodying a pivoted reciprocating vane and commonly used for operating windshield wipers on vehicles.

A disadvantageous feature of fluid motors of the type indicated results from the employment therein of snap action valve mechanism with consequent full pressure differential being present on the vane throughout the entire stroke thereof. As a result, the direction of the vane is suddenly reversed at the end of each stroke and this causes whipping of the driven parts, such as the windshield wiper blades.

An object of my invention is to provide novel means for controlling the flow of fluid to the piston or vane of a fluid motor of the type above mentioined, in a manner to cause the vane to slow down as it approaches the end of its stroke and to relatively slowly travel at the beginning of its stroke, thereby preventing rapid reversals of the motion and the consequent rapid whipping of the object driven by the motor.

A further object is to provide means adaptable for incorporation into a standard type of windshield wiper motor to control the flow of air to the motor in a manner such that the supply of air is limited or restricted at the beginning and end of each stroke of the vane.

A further object is to provide a simple means for accomplishing the above objects which can be readily manufactured and embodied in a windshield wiper type of fluid motor but which also may have other uses.

These and other objects will be apparent from the drawing and the following description. Referring to the drawing:

Fig. 1 is a side elevational view, partly broken away, of a windshield wiper fluid motor;

Fig. 2 is an enlarged fragmentary face view, partly in section, of a portion of the valve mechanism;

Figs. 2A and 2B are enlarged sections on lines 2A—2A, 2B—2B, respectively, of Fig. 2;

Fig. 3 is an enlarged sectional view on line 3—3 of Fig. 2;

Fig. 4 is a perspective view of a cam member;

Fig. 5 is a perspective view of a cam-follower control element;

Figure 6:
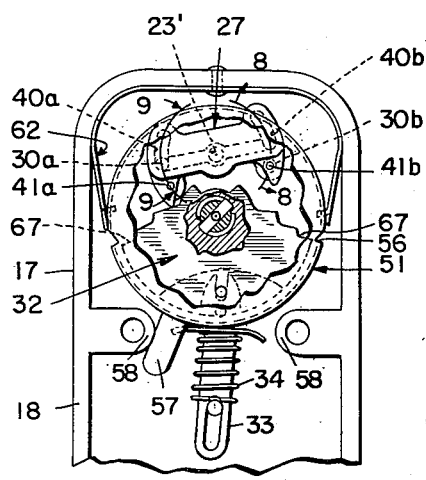
Figs. 6 and 7 are views similar to Fig. 2 but showing the parts in different positions.
Figure 7:
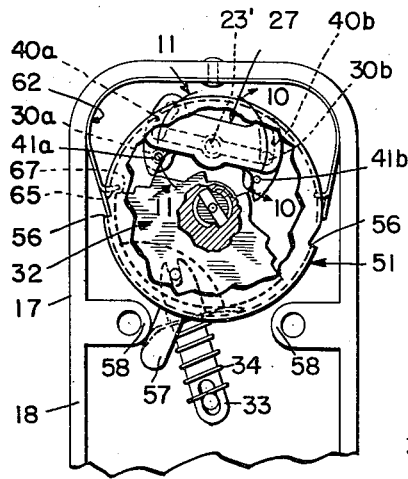
Figure 8:
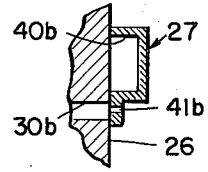
Figure 9:
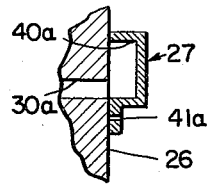
Figure 11:
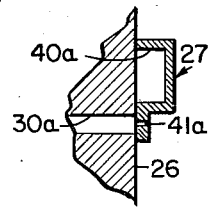
Figure 10:
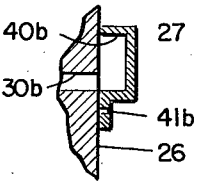
Figure 12:
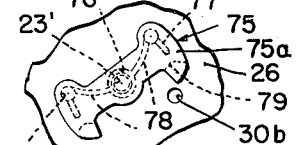
Figure 13:
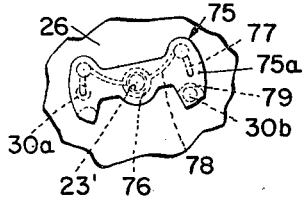

Figs. 8 and 9 are enlarged sectional views on lines 8—8 and 9—9, respectively, of Fig. 6;

Figs. 10 and 11 are enlarged sectional views on lines 10—10 and 11—11, respectively, of Fig. 7;

Figs. 12 and 13 are face views of a modified form of valve element.

More particularly describing the invention, numeral 11 generally indicates a fluid motor of the type used for actuating windshield wipers on automobiles. The motor has a housing 12 which defines an arcuate vane compartment 13 in which a vane or piston 14 reciprocates, being mounted upon a rock shaft 15 suitably journaled in the housing.

Part of the housing extends forwardly and centrally on one side to provide a valve housing portion 17 which includes the enclosing wall 18 and a partition wall 19. A filter chamber 20 is provided at one end containing fibrous material 21, the air supplied to the motor passing therethrough and through holes 19' and 18' in the walls. A cover 22 is fitted to wall 18.

The motor has a tubular fitting 23 to which a hose 24 can be attached for connecting the motor to a source of suction, such as the intake manifold of a motor, and tube 23 communicates through the housing of the motor with a supply passage 23'.

The housing provides a valve face 26 against which is positioned a valve 27, pivotally mounted on a tube 28 which forms part of the passage 23'.

The valve face 26 has ports 30a and 30b which communicate respectively with the opposite ends of the vane compartment 13. In the functioning of conventional devices of this nature, valve 27 connects one of the ports 30a, 30b with the central passage 23', which is normally at a pressure below that of atmospheric, thereby serving to evacuate air from one end of the vane compartment. At the same time the valve member uncovers or exposes the other port 30a, 30b to permit air to enter therethrough to the opposite side of the vane.

The valve is operated by a kicker mechanism including a kicker disk 32, a link 33, and a compression spring 34, the kicker disk 32 being suitably recessed at 35 for actuation by a portion 37 on the rock shaft 15 in a manner well known in the art.

It is a particular feature of my invention that I provide a special type of valve and control means therefor whereby to limit the flow of air to the motor at the beginning of each stroke of the vane. The valve 27 has an internal passage 40 communicating with passage 23' and terminating at each end in valve ports 40a and 40b. Also, the valve member is provided with holes 41a and 41b adjacent the ports 40a and 40b, the holes 41a and 41b being of relatively limited cross sectional area and considerably smaller than the ports 40a and 40b. When the valve is fully open, such as shown in Fig. 2, one port in the valve (40a) registers with one port (30a) in the face 26. The other port in face 26 (30b) is entirely exposed, thereby permitting a full supply of air to pass through port 30b, the kicker disk being appropriately undercut or recessed at each side at 32' so as not to close the ports 30a, 30b when overlying them. This is the position that the parts occupy during movement of the vane through the major portion of its stroke. As the vane approaches the end of its stroke the kicker member gradually moves to the position shown in Fig. 6, causing the valve member 27 to move with it to the position of Fig. 6. In consequence, the port 30b is covered by the valve member and hole 41b therein registers with the port so that only a limited amount of air is passed through the port, or in other words, the supply of air is restricted. As the vane progresses toward the end of the stroke, the kicker mechanism snaps over center and moves the valve member from the position of Fig. 6 to that of Fig. 7 which is an intermediate or arrested position, the kicker disk being held by a control element 62, later to be described. In this position the portion of the valve having hole 41a covers port 30a while the port 30b is in communication with the port 40b of the valve. In consequence, the air flow to the motor is restricted by the opening 41a of limited cross section as the vane begins a new stroke. After the vane has moved through several degrees the kicker disk is released and the valve member is moved to the extreme position which is comparable to that shown in Fig. 2 but opposite thereto, with consequent full pressure differential on the vane. As the vane approaches the end of its stroke, it causes the kicker mechanism and the valve member to move back toward center to a position comparable to that shown in Fig. 6.

My means for controlling the movement of the valve and arresting its movement to prevent it snapping to the full open or extreme position as it passes over center, such as would normally occur under the influence of the kicker mechanism, includes a cam element 51 frictionally mounted on a hollow stub shaft 52 receiving the end of the rock shaft 15 and having recessed portions 53 adapted to fit over part 37 on the rock shaft. The member 51 includes a peripheral flange 54 and it and the adjacent portions of the member have oppositely disposed recesses 56. The disk carries a tongue 57 which abuts housing portions 58, limiting movement of the cam. In this connection it may be pointed out that the cam and shaft 52 are relatively frictionally movable, the cam being held between plates 59 and 60 with a spring washer 61 between plate 60 and the cam. Thus slippage may occur between the cam and shaft when the tongue abuts the housing portions 58.

In conjunction with the cam member 51 I provide a control element 62 which consists of a flat spring mounted centrally, as by rivet 63, to the housing wall 18. This member is generally U-shaped and has two legs 64, each of which has an inturned flange 65 across about half its width at the inner side thereof. The flanges 65 would normally be in the path of the respective shoulders 67 on the kicker disk, limiting movement thereof as best shown in Fig. 7. However, the position of flanges 65 is controlled by the cam disk 54 upon which the straight or outer portions of legs 64 ride. Thus, when the cam disk is in the position shown in Fig. 1, the spring legs of the member 62 are held outwardly and do not interfere with the kicker member 32, permitting the kicker member and valve 27 to move to the extreme position as shown in Fig. 2. However, as the cam disk is rotated by the movement of the vane 14, the left leg 64 of element 62 falls into the recess 56 on the cam disk 54, thereby positioning the leg flange 65 in the path of the shoulder 67 of kicker member 32 so that, when that member subsequently snaps over from the position of Fig. 6, it is arrested by the appropriate leg portion 64 in the position shown in Fig. 7. As the vane begins a new stroke, it turns the cam disk 54 back toward the position of Fig. 1, moving the left leg 64 outwardly, permitting the kicker member to move the valve to extreme or full open position.

It will be apparent from the above that my mechanism accomplishes the various objects set forth above, and that, in particular, I have provided automatic means for restricting flow of air to the vane at the end and beginning of each stroke thereof.

In Figs. 12 and 13 I show another form of valve member, designated 75 having a central suction passage 76, ports 77 of key-slot shape and connecting passages 78. In this form of the invention the air flow is restricted in the intermediate positions of the valve comparable to those of Figs. 6 and 7 by the use of ports of reduced cross-sectional area at one end. Fig. 12 illustrates the full open position. Fig. 13 illustrates the position of the valve member in an intermediate position, which may be either the position comparable to that of Fig. 6 where the kicker mechanism has approached but not snapped passed center or the position comparable to that of Fig. 7 where the kicker disk is held by the control means. In the position of Fig. 13, the narrow end portion of one of ports 77 is shown in registration with the port 30a. Thus full suction is not supplied. The port 30b is completely open, the ends 75a of the valve member 75 being undercut at 79 so as not to close the ports when overlying them. It will be apparent, therefore, that the valve, when in intermediate position, does not provide normal or full cross-sectional area of suction passage means.

Although I have illustrated and described a preferred form of my invention, I contemplate that various changes and modifications can be made without departing from the invention, the scope of which is indicated by the following claims.

I claim:

1. In a fluid motor having a piston compartment and a piston reciprocable therein, said motor having a fluid supply passage and a pair of piston compartment passages communicating, respectively, with the ends of said compartment and each terminating in a port, valve means comprising a movably mounted valve member adapted to oscillate between two extreme positions alternately to cover and connect one of said ports to said supply passage and expose the other of said ports to atmosphere, snap-action oscillating knicker means to oscillate the valve member in timed relation to movement of the piston, and means for temporarily arresting said knicker means short of its full travel in each direction whereby to arrest said valve member short of each of said extreme positions on each movement thereof, said valve member, when arrested, connecting one of said ports to said supply passage and having means partially closing the other port.

2. Valve means for a fluid motor as set forth in claim 1 in which said valve member comprises an elongated, centrally pivoted body having a port at each end for registration, alternately, with the ports at the ends of the piston compartment passages, and in which the means for partially closing said other port comprises a lateral, apertured projection at each end of the body adjacent the ports therein.

3. In a fluid motor having a piston compartment and a piston reciprocable therein, said motor having a fluid supply passage and a pair of piston compartment passages communicating, respectively, with the ends of said compartment and each terminating in a port, valve means comprising a pivotally mounted valve member adapted to oscillate between two extreme positions alternately to cover and connect one of said ports to said supply passage and expose the other of said ports to atmosphere, means to oscillate the valve member in timed relation to movement of the piston, said last mentioned means comprising a snap-action kicker mechanism including an oscillatable kicker member engaging said valve member for imparting movement thereto, a cam movable in timed relation with the piston, a cam-follower element engageable with the cam, and interengaging means on said cam-follower element and said kicker member engageable in certain positions of said cam-follower element to arrest said kicker member short of each of said two extreme positions thereof, said valve member being so shaped as to connect one of said ports to said supply passage and partially close said other port when said kicker is in arrested position.

4. In a fluid motor having a reciprocable vane-type piston and a rock shaft journalling the piston, said motor having a fluid supply passage and a pair of piston compartment passages communicating, respectively, with the ends of said compartment and each terminating in a port, valve means comprising a pivotally mounted valve member adapted to oscillate between two extreme positions alternately to cover and connect one of said ports to said supply passage and expose the other of said ports to atmosphere, means to oscillate the valve member in timed relation to movement of the piston, said last mentioned means comprising a snap-action kicker mechanism including an oscillatable kicker member engaging said valve member for imparting movement thereto, a cam mounted on said rock shaft for movement therewith, and a cam-follower element engageable with said cam and, in certain positions of said cam with said kicker member to arrest said kicker member short of full movement thereof, said valve member being so shaped as to connect one of said ports to said supply passage and partially close said other port when said kicker is arrested.

5. Valve means as set forth in claim 4 in which said cam-follower element comprises a U-shaped spring having a pair of legs engaging, respectively, opposite sides of said cam, said legs being formed to provide thereon portions engageable with said kicker member.

6. In a fluid motor having a piston compartment and a piston reciprocable therein, said motor having a fluid supply passage and a pair of piston compartment passages communicating, respectively, with the ends of said compartment at one end and terminating in a motor port at the other, a pivotally mounted valve member having an internal passage communicating with said supply passage and having a valve port at each end of said internal passage, said valve ports being elongated generally in the direction of movement thereof and each having a wide end and a narrow end, said narrow end being of less width than the diameter of a motor port, said valve being adapted to oscillate between two extreme positions in either of which the wide end of one valve port registers with a motor port leaving the other motor port exposed snap-action oscillating kicker, means for oscillating said valve member in timed relation to movement of the piston, and means for temporarily arresting said kicker means short of its full travel in each direction whereby to arrest said valve member short of said extreme positions, said valve member, when arrested, having the narrow end of its port overlying one of said motor ports leaving the other motor port exposed.

7. In a fluid motor having a reciprocable vane-type piston and a rock shaft journalling the piston, said motor having a fluid supply passage and a pair of piston compartment passages communicating, respectively, with the ends of said compartment and each terminating in a port, valve means comprising a pivotally mounted valve member adapted to oscillate between two extreme positions alternately to cover and connect one of said ports to said supply passage and expose the other of said ports to atmosphere, means to oscillate the valve member in timed relation to movement of the piston, said last mentioned means comprising a snap-action kicker mechanism including an oscillatable kicker member engaging said valve member for imparting movement thereto, a cam mounted to be driven by said rock shaft, a kicker control member engageable with said cam, and, in certain positions of said cam, with said kicker member to arrest said kicker member short of full movement thereof, said valve member being so shaped as to connect one of said ports to said supply passages and at least partially expose said other port and further to restrict flow of fluid through one of said ports when said kicker is arrested.

8. In a fluid motor having a piston compartment and a piston reciprocable therein, said motor having a fluid supply passage and a pair of piston compartment passages communicating, respectively, with the ends of said compartment and each terminating in a port, valve means comprising a movably mounted valve member adapted to oscillate between two extreme positions alternately to cover and connect one of said ports to said supply passage and expose the other of said ports to atmosphere, snap-action oscillating kicker means to oscillate the valve member in timed relation to movement of the piston, and means for temporarily arresting said kicker means short of its full travel in each direction whereby to arrest said valve member short of each of said extreme positions on each movement thereof, said valve member, when arrested, connecting one of said ports to said supply passage and exposing the other of said ports, said valve member in said arrested position, providing means restricting flow through one of said ports.

References Cited in the file of this patent

UNITED STATES PATENTS

| 583,587 | Westinghouse | June 1, 1897 |
| 2,563,068 | Rappl et al. | Aug. 7, 1951 |
| 2,670,720 | Bitzer | Mar. 2, 1954 |